UNITED STATES PATENT OFFICE.

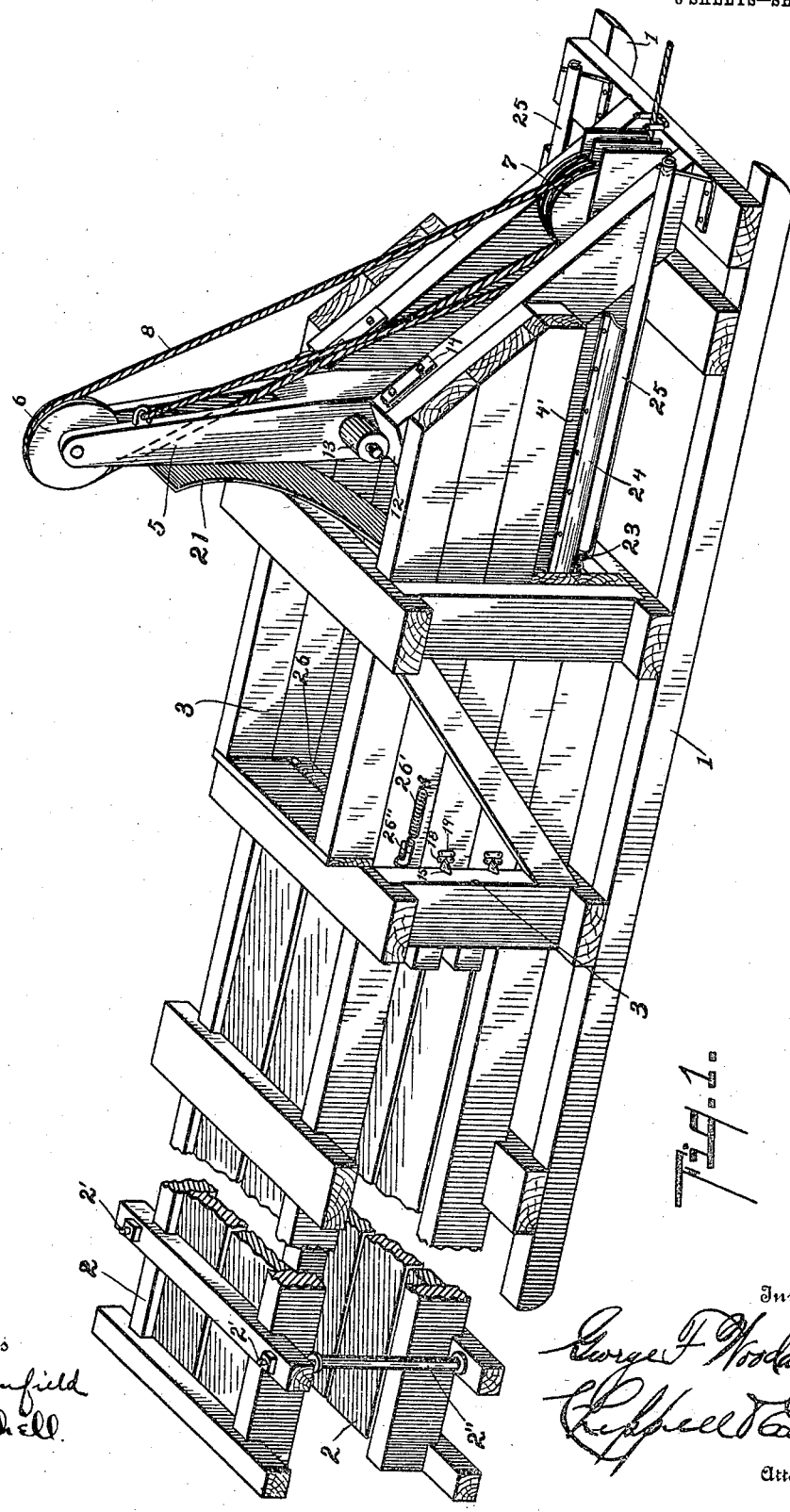

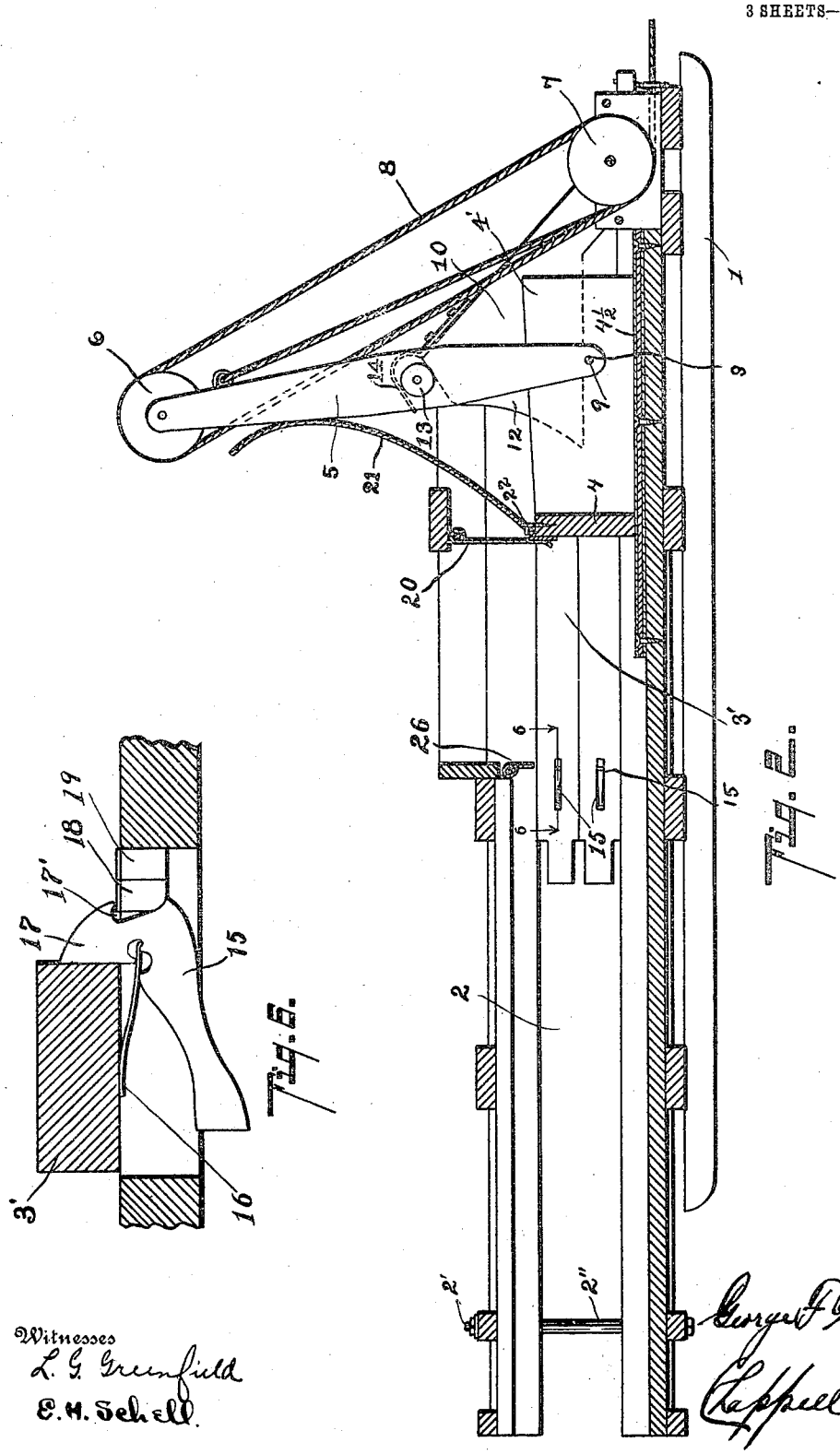

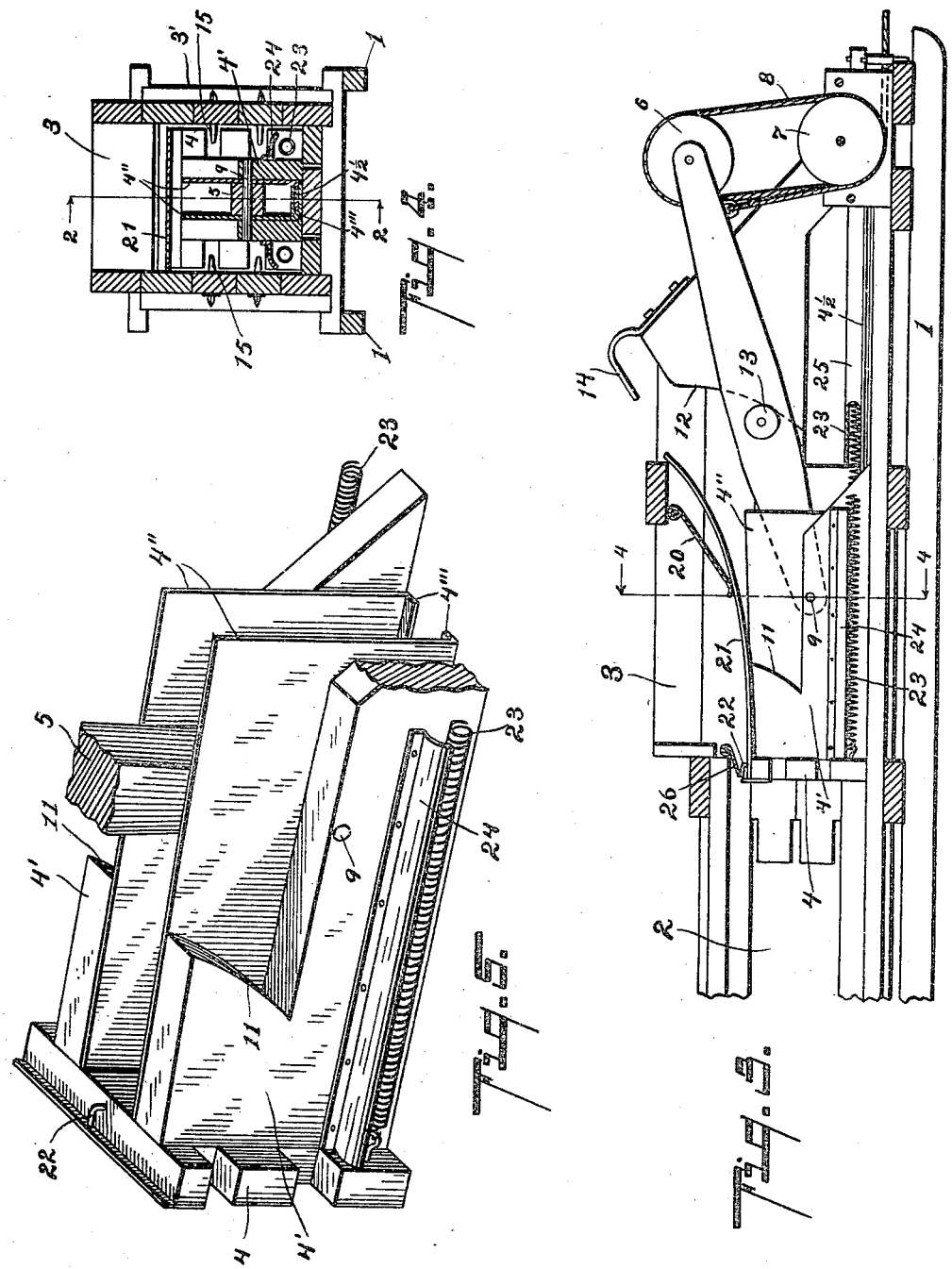

GEORGE F. WOODARD, OF KALAMAZOO, MICHIGAN.

HAY-PRESS.

960,612. Specification of Letters Patent. Patented June 7, 1910.

Application filed May 18, 1908. Serial No. 433,563.

*To all whom it may concern:*

Be it known that I, GEORGE F. WOODARD, a citizen of the United States, residing in the city of Kalamazoo, county of Kalamazoo, State of Michigan, have invented certain new and useful Improvements in Hay-Presses, of which the following is a specification.

This invention relates to improvements in hay presses, particularly to improvements in hay presses adapted to be operated by a single horse or team connected directly to the rope of a tackle.

The objects of the invention are: First, to produce improvements in baling chambers; second, to produce an improved retainer for retaining the charge of hay when it is driven into the baling chamber from the hopper; third, to provide an improved construction of guards or guides for introducing the charge of hay into the hopper; fourth, to provide an improved construction of plunger and actuating means therefor; fifth, to provide an improved means of returning the plunger to its original position after the charge has been driven into the baling chamber.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a perspective view of an improved hay baling press, the baling chamber being broken in section; Fig. 2 is a longitudinal sectional view, taken on a line corresponding to line 2—2 of Fig. 4 through the entire structure, portions being indicated by dotted lines; Fig. 3 is a similar sectional view of the plunger and its actuating means, with the plunger advanced to the baling chamber; Fig. 4 is a detail transverse sectional view, taken on a line corresponding to line 4—4 of Fig. 3; Fig. 5 is an enlarged detail perspective view of the plunger and its connected parts, portions being broken away to show details of construction; and Fig. 6 is an enlarged detail section taken on a line corresponding to line 6—6 of Fig. 2, showing the details of the plunger retainer.

In the drawing, similar numerals of reference refer to similar parts throughout the several views, and the sectional views are taken looking in the direction of the little arrows at the ends of the section lines.

Considering the numbered parts of the drawing, the base 1 is of the usual construction, the side bars being rounded at their ends for transporting the machine and sliding it along the ground, something like a sled or stone-boat, when it is being moved, of course, short distances. The baling chamber 2 is of the usual construction, except that the top and bottom thereof are retained together by a vertical bolt 2' through a sleeve 2'', which sleeve serves to hold the parts properly spaced and prevents their dropping too close together. The hopper, or charging chamber 3 is also of the usual form, except that I have provided improved guards therefor.

The plunger 4 is provided with forwardly-projecting timbers 4', between which are interposed plates 4'' which serve to receive the actuating lever 5 and guide the same. The lower edges of the plates 4'' are turned inwardly at 4''' (see Fig. 5) and engage underneath a guide strip $4\frac{1}{2}$ secured to the bottom of the forwardly-extending floor of the baling chamber. This strip is supported on a strip of metal beneath the same, so that the inwardly-projecting edges 4''' serve to guide and retain the body of the plunger in place. To a suitable cross piece at the front end of the baling chamber is secured a hinged guard 20 which drops down in front of the plunger, as indicated in Fig. 2, when the plunger is withdrawn. On top of the plunger head 4 is secured a guard 21, the same being retained by a hook 22 which receives the same and can be turned at an angle for retaining it.

On each side of the actuating lever 5 is a roller 13, these engage upon a pair of upwardly projecting cams 12, so that, when the top end of the lever 5 is pulled forwardly and downwardly—owing to the fact that it is connected by a pivot 9 to the body of the plunger—the plunger is swung rearwardly rapidly by the action of the lever, in the first instance; and, as pressure is continued to be applied to the lever 5, the roller 13 passes down over the cam-shaped surface 12, which controls the operation of the plunger and enables it to be advanced with great power and at a slow rate at the finish, and to be moved very quickly at the start and on the return. The rollers 13 pass under a pair of hooks 14 at the top to prevent accidental displacement of the lever when the plunger is in its withdrawn position.

The lever is actuated by a pulley and tackle construction, a pulley 6 being at the upper end of the lever, and a pulley 7 being mounted at the front end of the machine, a rope 8 being passed over the same to enable the application of pressure by a pull on the rope, as by hitching a horse or a team thereto. Of course, the pull can be accomplished in any desired way. When the plunger is advanced and has compressed a charge into the baling chamber, of course, it is impossible to return the same by this pulley and tackle mechanism, and I therefore provide a pair of springs 23, which are connected to the plunger head 4 and extend to the forward end of the machine where they are secured and serve as the means for properly returning the plunger. I protect springs 23 by guards 24 on the sides of the plunger, and permit the springs to return into the interiors of tubes 25 which are open on their under sides. This prevents the springs from picking up hay or straw or other debris, during the operation of the machine.

When the plunger is advanced, it is, of course, necessary that the charge be retained by suitable retainers, and I have provided an improved retainer 15 for this purpose. This is made of a simple piece of casting (see Fig. 6) somewhat hook-shaped, and an irregular opening is provided in the same for receiving a plate spring 16, which spring is retained in position by its own tension on the sides of the irregular aperture and throws the ratchet hook inwardly into the baling chamber. A projecting end 17 engages the upright post or bar 3' and affords a substantial resistance for the hook, and the hook is retained in place by being provided with a notch 17' toward its front side curved to receive a bearing block 18 which extends into the notch and permits sufficient motion for the operation of the ratchet hook. This block 18 is held in position by a block 19 back of it, all being arranged in a suitable slot in the side of the baling chamber and charging chamber. By simply removing the block 19 by loosening two small screws or nails, the whole device can be readily disassembled for repairs.

An apron 26 is provided at the rear of the charging chamber or hopper, which is held normally in position by a spring 26' engaging a suitable arm 26" which is connected to the apron 26.

In operating my improved press, the hay is put within the same, as it appears in position in Fig. 2. It will be seen that the guards 20 and 26 enable the operator to put the hay into the charging chamber and compress it or force it down wherever it may be needed. The rope 8 is then drawn tight and swings the lever down to the position indicated in Fig. 3. The rollers 13, acting on the cam surfaces, advance the plunger and carry it forward and press the charge ahead, the apron 26 yielding for that purpose. When in this position, the guard 21 passes under the guard 20 and covers over the top of the rear portion of the plunger, so that the persons feeding the press can fill the upper portion of the hopper 3 and compress the hay so that, as soon as the plunger is withdrawn by the action of the springs 23, the charge can be immediately pressed down into the charging chamber and the operation repeated very promptly. The lever is very effectively guided by the broad plates 4½ and is retained in position by the parts I have indicated. Of course, when the charge is advanced, the retainers 15 engage the same.

Having thus described my invention, what I claim as new and desire to secure by Letters Patent is:

1. In a baling press, the combination of a suitable base; a baling chamber; retainers for the baling chamber consisting of the blocks 15, provided with irregular apertures and notched at 17 in the front thereof, having inwardly-projecting engaging ends and outwardly-projecting hooked ends 17 with a flat spring 16 inserted into said irregular apertures for retaining the same; a bearing block 18 in the notch 17' in the front part thereof; and a removable block 19 back of the block 18, all coacting substantially as described and for the purpose specified.

2. In a hay baling press, the combination with the charging chamber, of a plunger 4 with a body portion 4' and the central guide plates 4" with inwardly projecting flanges 4''' at the bottom; a guide strip 4½ secured to the forwardly extending floor of the baling chamber engaging the flanges 4'''; a lever pivoted at 9 between the said plates and extending upwardly therefrom between the said plates; rollers 13 on the sides of the said lever; cam blocks 12 supported on the baling press frame at each side of the said lever to coact with the said rollers; a tackle and pulley construction consisting of a pulley 6 on the upper end of the said lever and a pulley 7 mounted on the said frame with a rope 8 around the same for actuating the said lever and causing the rollers on the side thereof to coact with the said cam surface, all coacting substantially as described for the purpose specified.

3. A baling press consisting of a suitable baling chamber; a charging chamber; a plunger acting through the said charging chamber to deliver a charge to the baling chamber; means for actuating said plunger consisting of a lever pivoted thereto and extending upwardly therefrom; a removable apron pivotally connected to the top of said plunger and extending forward and resting against the said lever for closing the charging chamber when the plunger is advanced, and a pivoted guard 26 retained in vertical position by a spring when the plunger is withdrawn, all coacting substantially as described and for the purpose specified.

4. In a baling press, the combination of a charging chamber with a plunger suitably guided to pass from the said charging chamber to the baling chamber; a lever pivoted to the plunger; rollers on the sides of said lever; a cam surface for said rollers to travel upon; and a pulley and tackle for actuating the said lever, coacting as specified.

5. In a baling press, the combination of a charging chamber with a plunger suitably guided to pass from said charging chamber to the baling chamber; a lever pivoted to the said plunger; guiding projection on the said lever; a cam surface for receiving the said guiding projection; means for actuating the said lever whereby the said lever and cam coact to start the plunger rapidly and finish with a powerful, slow movement, coacting as specified.

6. In a baling press, the combination of a charging chamber with a plunger suitably guided to pass from said charging chamber to the baling chamber; suitable connections for actuating the said plunger for driving the same into the baling chamber; a coiled spring connected to the said plunger at one end and to the frame at the opposite end, for withdrawing the said plunger when the pressure is released; a tubular shield surrounding the said coiled spring and secured at its outer end to the said framework, permitting the said spring to reciprocate therein, and a guard secured to the said plunger and extending over said shield and being adapted to reciprocate above the said shield, coacting as specified.

In witness whereof, I have hereunto set my hand and seal in the presence of two witnesses.

GEORGE F. WOODARD. [L. S.]

Witnesses:
GERTRUDE TALLMAN,
L. G. GREENFIELD.